US011080908B2

(12) United States Patent
Bostick et al.

(10) Patent No.: US 11,080,908 B2
(45) Date of Patent: *Aug. 3, 2021

(54) SYNCHRONIZED DISPLAY OF STREET VIEW MAP AND VIDEO STREAM

(71) Applicant: International Business Machines Corporation, Armonk, NY (US)

(72) Inventors: James E. Bostick, Cedar Park, TX (US); John M. Ganci, Jr., Raleigh, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,613

(22) Filed: Jun. 27, 2018

(65) Prior Publication Data
US 2018/0308271 A1 Oct. 25, 2018

Related U.S. Application Data

(63) Continuation of application No. 14/684,467, filed on Apr. 13, 2015, now Pat. No. 10,083,532.

(51) Int. Cl.
*G06T 11/60* (2006.01)
*G11B 27/10* (2006.01)
*G11B 27/30* (2006.01)

(52) U.S. Cl.
CPC ............. *G06T 11/60* (2013.01); *G11B 27/10* (2013.01); *G11B 27/30* (2013.01); *G06F 2203/04803* (2013.01)

(58) Field of Classification Search
CPC combination set(s) only.
See application file for complete search history.

(56) References Cited

U.S. PATENT DOCUMENTS 6,711,497 B1 * 3/2004 Winter ................... G01C 21/32
701/532
7,134,088 B2 * 11/2006 Larsen ................... G09B 9/003
715/765

(Continued)

OTHER PUBLICATIONS

Good Johnson, Motilew A., U.S. Appl. No. 14/684,467, Office Action dated Mar. 31, 2016, 13 pgs.

(Continued)

*Primary Examiner* — Motilewa Good Johnson
(74) *Attorney, Agent, or Firm* — Brian M. Restauro; Madeline F. Schiesser; Keohane & D'Alessandro, PLLC

(57) ABSTRACT

Approaches presented herein enable displaying of a street view or map in the context of a video stream object. Specifically, captured video is analyzed for a plurality of geo-coordinate and direction metadata associated with frames of the video. The video may also be analyzed for visual indicia of location or direction. A user watching the video selects an object therein, which may be then identified by its coordinates and labeled for the user. A map or street view corresponding to the selected object is shown synchronized to the video (e.g., in a side-by-side view), based on the geo-coordinate and direction metadata associated with the video frames. The synchronized video and map speed may be manipulated. The video may also be broken up by frames, and the user permitted to navigate beyond the bounds of the video, where frames are played when the user navigates to areas within the video.

20 Claims, 6 Drawing Sheets

(56) References Cited

U.S. PATENT DOCUMENTS

| | | | |
|---|---|---|---|
| 7,463,978 B2* | 12/2008 | Okada | G01C 21/367 340/995.15 |
| 8,606,021 B2 | 12/2013 | Conwell | |
| 8,954,853 B2* | 2/2015 | Lacaze | G06F 3/04855 715/720 |
| 9,121,724 B2* | 9/2015 | Piemonte | G06T 19/003 |
| 9,380,275 B2 | 6/2016 | Davidson, Jr. et al. | |
| 9,936,214 B2* | 4/2018 | Loyd | G06F 16/29 |
| 2003/0052896 A1* | 3/2003 | Higgins | G06T 17/05 345/619 |
| 2005/0278115 A1* | 12/2005 | Okada | G01C 21/367 701/410 |
| 2006/0200308 A1* | 9/2006 | Arutunian | G06Q 30/00 701/532 |
| 2006/0279630 A1 | 12/2006 | Aggarwal et al. | |
| 2007/0070069 A1 | 3/2007 | Samarasekera et al. | |
| 2007/0110338 A1 | 5/2007 | Snavely et al. | |
| 2009/0327894 A1 | 12/2009 | Rakib et al. | |
| 2010/0215250 A1 | 8/2010 | Zhu | |
| 2010/0250136 A1 | 9/2010 | Chen | |
| 2011/0007134 A1 | 1/2011 | Knize et al. | |
| 2011/0007962 A1 | 1/2011 | Johnson et al. | |
| 2011/0141141 A1 | 6/2011 | Kankainen | |
| 2012/0086727 A1* | 4/2012 | Korah | G06F 3/03 345/633 |
| 2012/0221552 A1* | 8/2012 | Reponen | G06F 16/9537 707/722 |
| 2013/0061147 A1 | 3/2013 | Beaurepaire | |
| 2013/0229434 A1 | 9/2013 | Ofek et al. | |
| 2013/0321461 A1* | 12/2013 | Filip | G06F 3/011 345/632 |
| 2014/0225921 A1* | 8/2014 | Bruhn | G11B 27/00 345/633 |
| 2014/0267723 A1 | 9/2014 | Davidson, Jr. et al. | |
| 2014/0362108 A1* | 12/2014 | Aguera-Arcas | G06T 13/80 345/629 |
| 2015/0206337 A1 | 7/2015 | Roimela | |
| 2015/0249788 A1 | 9/2015 | Sato et al. | |
| 2015/0268058 A1 | 9/2015 | Samarasekera et al. | |
| 2016/0300386 A1 | 10/2016 | Bostick et al. | |

OTHER PUBLICATIONS

Good Johnson, Motilew A., U.S. Appl. No. 14/684,467, Final Office Action dated Sep. 2, 2016, 13 pgs.

Good Johnson, Motilew A., U.S. Appl. No. 14/684,467, Office Action dated Apr. 21, 2017, 10 pgs.

Good Johnson, Motilew A., U.S. Appl. No. 14/684,467, Final Office Action dated Oct. 4, 2017, 10 pgs.

Good Johnson, Motilew A., U.S. Appl. No. 14/684,467, Notice of Allowance dated May 18, 2018, 9 pgs.

Appendix P, "List of IBM Patents or Patent Applications Treated as Related", May 20, 2020, 2 pages.

* cited by examiner

SYNCHRONIZED DISPLAY OF STREET VIEW MAP AND VIDEO STREAM

CROSS REFERENCE TO RELATED APPLICATIONS

The present patent document is a continuation of U.S. patent application Ser. No. 14/684,467, filed Apr. 13, 2015, entitled "SYNCHRONIZED DISPLAY OF STREET VIEW MAP AND VIDEO STREAM", the disclosure of which is incorporated herein by reference.

TECHNICAL FIELD

This invention relates generally to displaying a video in a map context and, more specifically, to synchronizing a map view with a video based on coordinate data.

BACKGROUND

Electronic mapping is a system of providing interactive maps in a computerized environment, such as through an electronic device. Electronic maps have become popular as a means to search remote locations. Trip planning, self-education, navigation, etc., may be accomplished from the convenience of an electronic device. Electronic maps also offer an interactive feature not found in their real-world counterparts. For example, Google Maps' mapping service offers satellite imagery, street maps, and "Street View" perspectives, as well as functions such as a route planner, in which a user may, for example, scroll through, zoom in/out, search, etc. (Google Maps and Street View are trademarks of Google Inc. in the United States). Services such as Apple Maps (a trademark of Apple Inc.) and Mapquest (a registered trademark of America Online, Inc.) offer similar interactive maps, which may be embodied, for example, as web services, or computerized applications.

SUMMARY

In general, embodiments described herein provide a display of a street view or a map in the context of a video stream object. Specifically, captured video is analyzed for a plurality of geo-coordinate and direction metadata associated with frames of the video. The video may also be analyzed for visual indicia of location or direction. A user watching the video selects an object therein, which may be then identified by its coordinates and labeled for the user. A map or street view corresponding to the selected object is shown synchronized to the video (e.g., in a side-by-side view), based on the geo-coordinate and direction metadata associated with the video frames. The synchronized video and map speed may be manipulated. The video may also be broken up by frames, and the user permitted to navigate beyond the bounds of the video, where frames are played when the user navigates to areas within the video.

One aspect of the present invention includes a method for displaying location imagery in context with a video stream, the method comprising the computer-implemented steps of: extracting locational metadata from a set of video data, the video data comprising a plurality of frames; identifying a set of geographic locations associated with the plurality of frames based on the locational metadata; generating a set of location imagery associated with the set of geographic locations; displaying the set of location imagery with the plurality of frames; and synchronizing the set of location imagery to the plurality of frames based on the set of geographic locations.

Another aspect of the present invention includes a system for displaying location imagery in context with a video stream, the computer system comprising: a memory medium comprising program instructions; a bus coupled to the memory medium; and a processor for executing the program instructions that cause the system to: extract locational metadata from a set of video data, the video data comprising a plurality of frames; identify a set of geographic locations associated with the plurality of frames based on the locational metadata; generate a set of location imagery associated with the set of geographic locations; display the set of location imagery with the plurality of frames; and synchronize the set of location imagery to the plurality of frames based on the set of geographic locations.

Yet another aspect of the present invention includes a computer program product for displaying location imagery in context with a video stream, the computer program product comprising a computer readable storage device, and program instructions stored on the computer readable storage device, to: extract locational metadata from a set of video data, the video data comprising a plurality of frames; identify a set of geographic locations associated with the plurality of frames based on the locational metadata; generate a set of location imagery associated with the set of geographic locations; display the set of location imagery with the plurality of frames; and synchronize the set of location imagery to the plurality of frames based on the set of geographic locations.

Yet still another aspect of the present invention includes a method for deploying a system for displaying location imagery in context with a video stream, comprising: providing a computer infrastructure that includes at least one computer device that operates to perform the steps of: extracting locational metadata from a set of video data, the video data comprising a plurality of frames; identifying a set of geographic locations associated with the plurality of frames based on the locational metadata; generating a set of location imagery associated with the set of geographic locations; displaying the set of location imagery with the plurality of frames; and synchronizing the set of location imagery to the plurality of frames based on the set of geographic locations.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
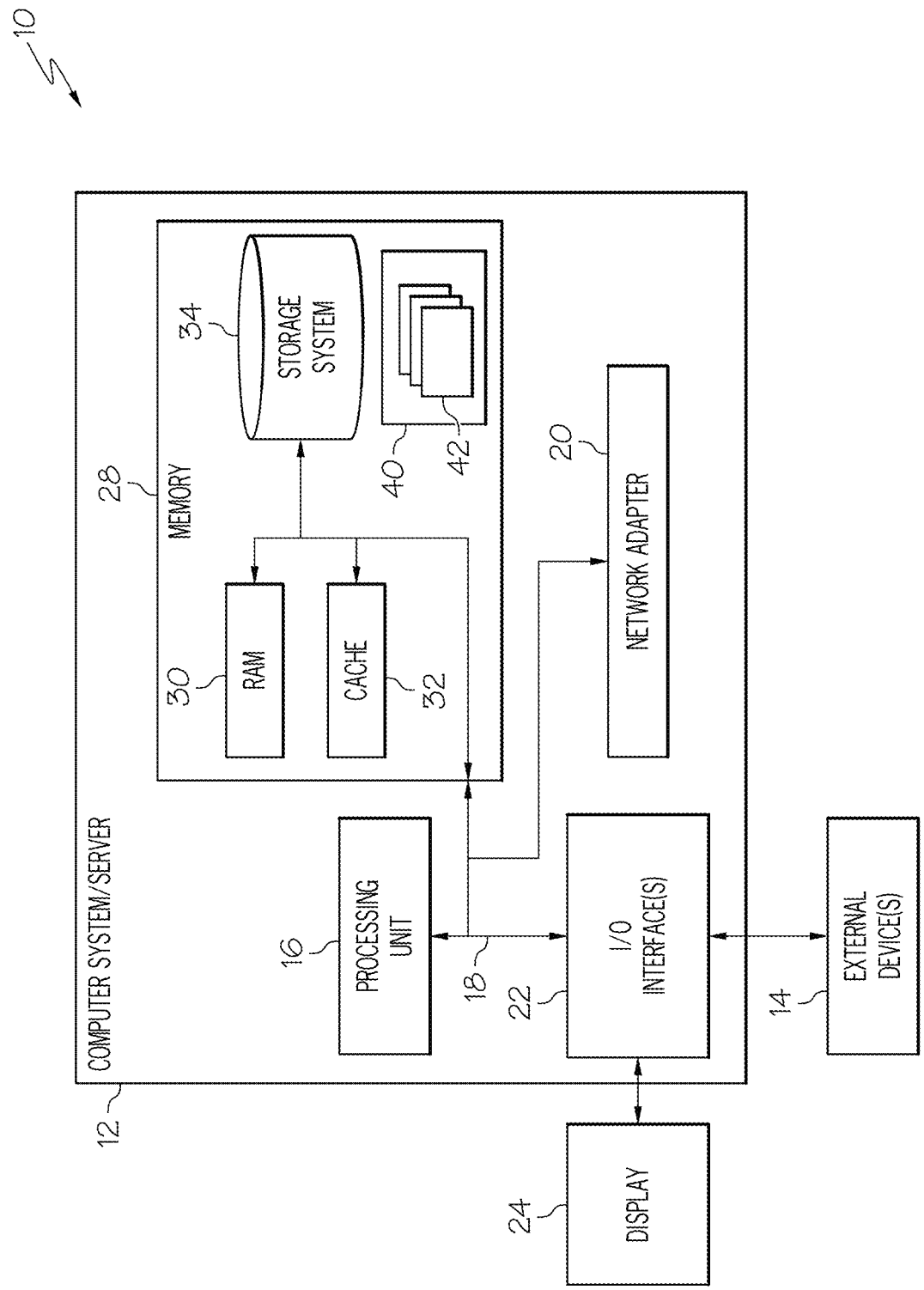
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide a display of a street view or a map in the context of a video stream object. Specifically, captured video is analyzed for a plurality of geo-coordinate and direction metadata associated with frames of the video. The video may also be analyzed for visual indicia of location or direction. A user watching the video selects an object therein, which may be then identified by its coordinates and labeled for the user. A map or street view corresponding to the selected object is shown synchronized to the video (e.g., in a side-by-side view), based on the geo-coordinate and direction metadata associated with the video frames. The synchronized video and map speed may be manipulated. The video may also be broken up by frames, and the user permitted to navigate beyond the bounds of the video, where frames are played when the user navigates to areas within the video.

The inventors of the present invention have discovered that, when viewing a video of a location, for example, it can be desirable to determine what buildings and structures are in the video or to further explore an area shown in the video. However, it can be inconvenient and/or confusing to open another browser or application and attempt to find additional information on objects in the video without having any information about the building or structure being searched. Furthermore, a video sometimes only shows a location from a limited perspective. In order to further explore the area shown in the video, it is generally necessary in current solutions to open a map or street view and then flip back and forth between the video and map/street view in order to use the video for context. Therefore, it is desirable to open a street view or map synchronized to the video as a reference. The approaches described herein contain numerous advantages over current methods including, but not limited to, offering maps and street views synchronized to a plurality of frames within a video.

Referring now to FIG. 1, a computerized implementation 10 of an embodiment for displaying location imagery in context with a video stream will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for displaying location imagery in context with a video stream. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for displaying location imagery in context with a video stream, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As is further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42, also known as program components, generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
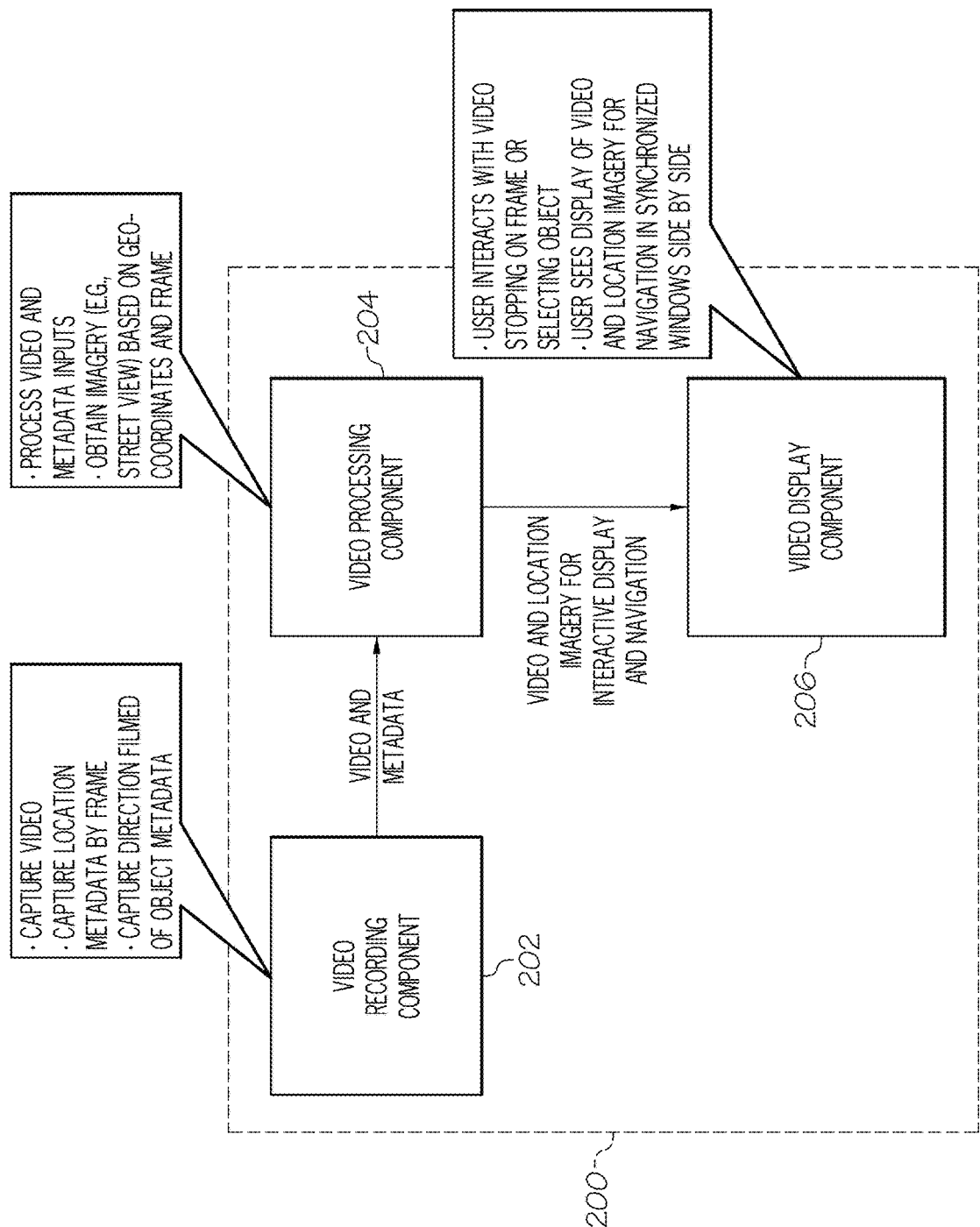
FIG. 2 shows a block diagram highlighting component interaction according to illustrative embodiments.

Referring now to FIG. 2, a block diagram highlighting component interaction according to illustrative embodiments is shown. In some embodiments, video mapping system 200 comprises video recording component or device 202, video processing component or device 204, and video display component or device 206. As used herein, video may refer to data associated with any electronic medium used for recording, copying, playing-back, and displaying moving visual and audio media. This data may include a plurality of images or frames, audio or sound, and other associated data such as: a frame rate, an interlaced or progressive characteristic, an aspect ratio, a color model name, video quality, a stereoscopic characteristic, and a compression characteristic, such as interframe compression. Typically, when a plurality of the images or frames is played in series, an appearance of motion between frames is created. Video data may be embodied, for example, as a set of video files, a set of video data, a video stream, etc. Video data may reside, in some non-limiting examples, at a local device, such as video recording device 202, video processing device 204, and/or video display device 206, or at a remote location, such as hosted on a server of a video sharing service or stored in a remote cloud drive.

Video recording component 202 is configured to capture video and location (geographic-coordinate and direction) metadata. The same is transferred (e.g., physical or electronic transfer by a user, automatic or user prompted upload, etc.) to processing component 204 from video recording component 202. Video processing component 204 is configured to obtain location imagery including, but not limited to, map(s), street view(s), aerial view(s), helicopter view(s), satellite image(s), and/or the like, based on the received geo-coordinate and direction metadata. These are transferred (e.g., transfer by a user, automatic or user prompted upload or download, etc.) to video display component 206 from processing component 204. The components are not limited to interacting in this order. For example, video display component 206 may be configured to receive video from video recording component 202, and then request location imagery from video processing component 204 based on a user prompt.

Examples of video recording component or device 202 include a digital camera, a smart phone, a tablet, a video recorder, a digital video recorder, augmented reality glasses with video, or any other computerized device comprising a camera. As discussed above, video recording component 202 is enabled with geo-coordinate and direction awareness. This may be achieved, for example, by the presence of a GPS unit, a compass component, or the like. In any case, video recording component 202 captures, records, and/or stores video and associated geo-coordinate and direction metadata of the video. A location of video recording component 202 may be moved during a video recording (e.g., from point A to point B), and, as such, video recording component 202 may, for example, record/store updates to the geo-coordinates and direction in the metadata, or continuously record and store coordinates (e.g., frame-by-frame) during the video recording. In some embodiments, a video recording device may be modified (e.g., via program instructions installed thereon) to capture geo-coordinate and direction metadata (or data) associated with a video.

Examples of video processing component or device 204 include a digital camera, a smart phone, a tablet, a video recorder, a smart TV, a personal computer, a remote server, and the like. As discussed above, in some embodiments, video processing component 204 receives geo-coordinates and directions in video metadata (e.g., associated with each frame of the video). In an embodiment, video processing component 204 processes the video to organize the geo-coordinate and direction metadata and video frames and generates an interactive set of location imagery corresponding to the direction and coordinates in the metadata. In some embodiments, the interactive set of location imagery may be generated based on an interpolation; for example, video processing component 204 may generate location imagery associated with a location between two geo-coordinates in the metadata. Furthermore, in some embodiments, video processing component 204 may generate location imagery determined to be near the geo-coordinates (e.g., within a predetermined range of a geo-coordinate) or in alternate direction of a direction in the metadata. In some embodiments, a video processing device may be modified (e.g., via program instructions installed thereon) to process video metadata and generate an interactive set of location imagery.

Examples of video display component or device 206 include a digital camera, smart phone, a tablet, a video recorder, a smart TV, a personal computer, and the like. As discussed above, a user may view and/or interact with a synchronized video and location imagery on video display component 206. As is discussed in more detail below, this interaction may include, in some embodiments, selecting an object within the video and requesting (e.g., with a mouse click, finger tap, or other user input by an external user device, which may be anytime, including when the video is playing or paused) location imagery associated with that object. In some embodiments, a user may interact with the video and location imagery by adjusting a speed at which the video is played and watching a display of location imagery corresponding to frames of the video. In some embodiments, a user may furthermore navigate in the location imagery beyond the bounds corresponding to the video, where frames are played when the user navigates to areas within the video. A video display device may be modified (e.g., via program instructions installed thereon) to permit a user to view/interact with a synchronized video and location imagery.

In some embodiments, video mapping system 200 may be implemented in a single device or across a plurality of separate devices. For example, a user may capture video on a smart phone device and then view the video with interactive location imagery on the same smart phone. Alternatively, in another example, a user may capture a video on a smart phone device and later view the video with interactive location imagery on a Smart TV device or computer. In either case, the video may be processed by an in-device video processing component 204 or by a remote video processing device 204, such as a server-managed device or computer.

In other embodiments, one or more components may be omitted. For example, in some embodiments, a user may acquire a video, for example, from the Internet or other media source, instead of recording the video on a device of the user. In one example, a user may be watching a video posted on a video sharing website about a route filmed by another in Rome, Italy. The user may be interested in a specific building from its architecture and want to identify the building to know more about it for an upcoming trip to Rome. In this case, video processing component 204 receives the third party video and searches the video metadata for locational metadata (e.g., geo-coordinate and direction metadata). If locational metadata is available, video processing component 204 continues to process the video and generate an interactive set of location imagery as described above. However, if locational metadata is not available or is limited or defective, in some embodiments, video processing component 204 may perform correctional analytics and/or search the video for visual indicia of location, as is discussed in more detail below.

Figure 3:
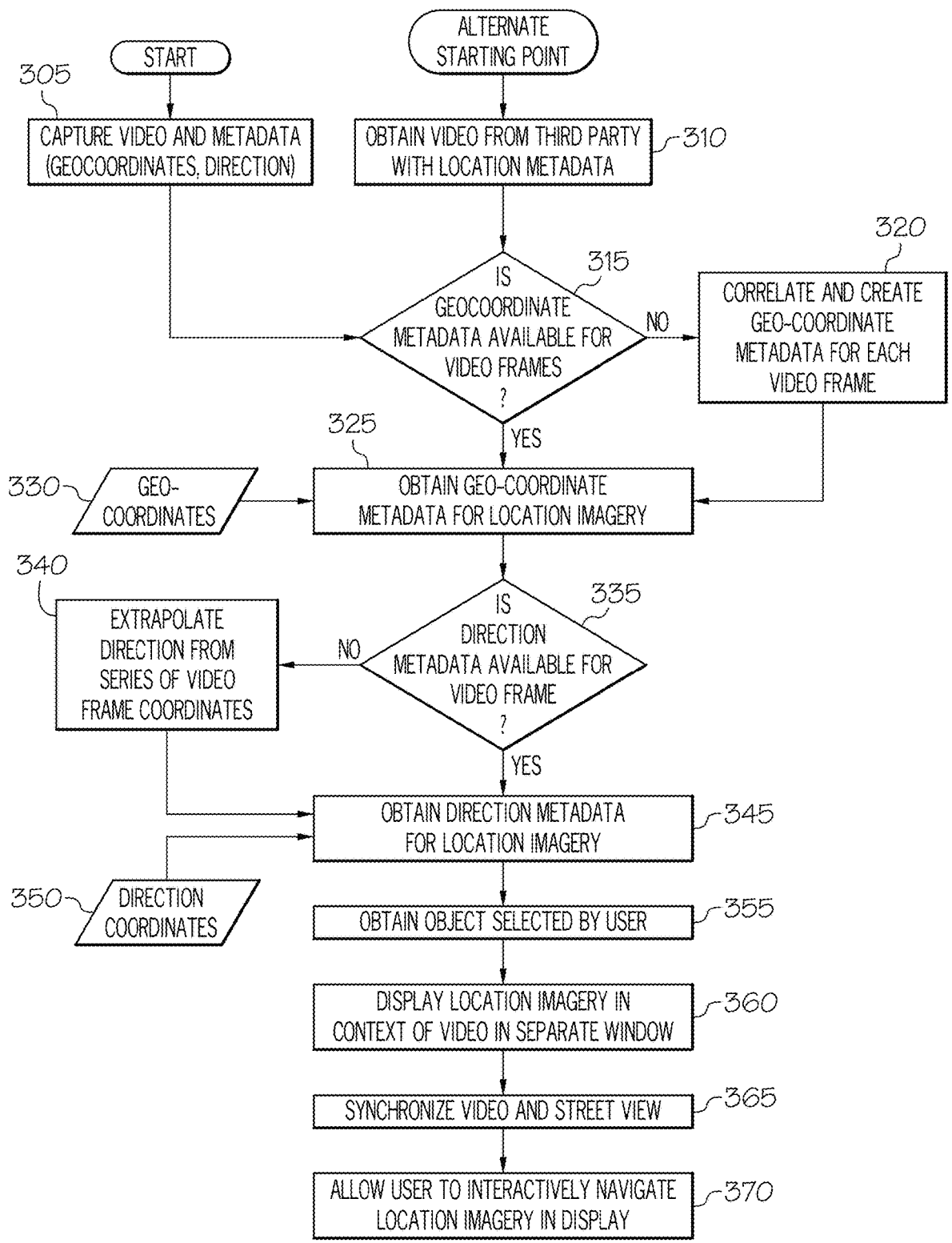
FIG. 3 shows an implementation flowchart according to illustrative embodiments.

Referring now to FIG. 3, a detailed implementation process flowchart of the video mapping system is depicted, in which the interactions of video recording component 202, video processing component 204, and video display component 206 of video mapping system 200 will be further understood. Embodiments of the present invention are not limited to the steps depicted here, nor are embodiments of the present invention limited to the order depicted. In some embodiments, some portions of the implementation process flow may be omitted or occur in a different order.

According to an embodiment of the present invention, a user captures a video with a video recording device at step 305. Included in the captured video is locational metadata. More specifically, geo-coordinates and a direction are captured and associated with, for example, each frame of the video, such as via a metadata tag. In some embodiments, a locational metadata tag may only be applied to every few frames, depending on storage space, frame speed, etc. In a typical embodiment, locational data may be determined by a GPS and a compass, but in some embodiments, locational data may also be determined, by way of non-limiting example, by an accelerometer, cell tower pings, relative sun/star positions, visual landmarks, etc.

In an illustrative example, a user captures video as the user walks along the Champs-Elysees in Paris, France, visiting different attractions, buildings, etc. A video recording device captures geo-coordinate metadata using a GPS service, or other location aware services, for given video frames. The video recording device also captures direction metadata using, for example, a compass built into the device. The user may determine a metadata sample rate (e.g., all video frames, once per second, etc.), configuring how often the metadata is associated with the video. The video frames and metadata are stored as video data on the video recording device or uploaded to a storage location, such as a cloud storage location, for later use by the user.

In an alternative embodiment of the present invention, a user may obtain a video from a third party source, such as a video sharing website at step 310. The third party video may comprise locational metadata. For example, locational metadata in the form of geo-coordinate or direction metadata may be associated with frames of the video.

In any case, at step 315, it is determined whether geo-coordinate locational metadata is available for the video frames. In some non-limiting embodiments, the video data will be searched for geo-coordinate metadata associated with every frame of the video. In other embodiments, geo-coordinates are considered available if associated with a frame at least every few frames (e.g., every 10 frames, every 0.5 seconds).

In the case that geo-coordinate metadata is not available, or is limited or defective, at step 320 any available metadata and/or visual data is correlated using analytics to create geo-coordinate metadata for the video frames. In an example of such analytics, if a user opens a video and selects an object in the video to view in a mapping/location imagery context, then the video is processed to determine a "best guess" based on available metadata and/or visual data of what and where the object the user seeks to view is. Accordingly, although each frame of a video may not have geo-coordinate data, an approximation of location may be created. In an embodiment, this approximation may be accomplished, for example, by interpolation between frames with associated geo-coordinate metadata. In another embodiment, this approximation may be accomplished, for example, by identifying known visual landmarks in certain frames of the video (e.g., the Empire State Building in New York City), associating known coordinates with those frames (e.g., 40°44'54.36"N, 73°59'08.36"W), and estimating geo-coordinates for the remaining frames based on the landmark frames. A known landmark may be identified, inter alia, by running an image of the landmark against a landmark image database, or performing an internet-based search of the landmark image. In estimating geo-coordinates for the remaining frames, a feature of a video recording device such as an accelerometer or clock may be employed to assist in establishing time and distance traveled.

In any case, the geo-coordinates are obtained at step 325, whether, in various non-limiting embodiments, through correlation with existing data as in step 320 or as stored in video metadata. If the latter, at step 330, geo-coordinate metadata is retrieved from video data (e.g., shot by a user or a third party and obtained by the user) by, for example, a video processor. In various embodiments, the geo-coordinate metadata may be in the form of a tag associated with a frame of the video, or may be sorted and associated with a frame of the video. Based on the obtained geo-coordinates, coordinates of structures and objects seen in the video frames may be determined, for example, via image processing.

Moreover, at step 335, it is determined whether direction metadata is available for the video frames. Steps 335-350 may in some embodiments occur before, after, or simultaneously with steps 315-345. In any case, in non-limiting embodiments, the video data will be searched for direction metadata associated with every frame of the video. In other embodiments, direction metadata is considered available if associated with a frame at least every few frames (e.g., every 10 frames, every 0.5 seconds).

In the case that direction metadata is not available, or is limited or defective, at step 340, any available metadata and/or visual data is correlated using analytics to create direction metadata for the video frames. Continuing the example of analytics above, when the user opens the video and selects an object in the video to view in a mapping/location imagery context, then the video is processed to determine a "best guess" of what direction the video is facing if this data is not readily available. Accordingly, although each frame of a video may not have direction data, an approximation of direction may be created. In an embodiment, this approximation may be accomplished, for example, by interpolation between frames with associated direction metadata. In another embodiment, this approximation may be accomplished, for example, by identifying known visual landmarks or directional indicators (e.g., a sunrise), associating a known direction with those frames (e.g., east), and estimating a direction for the remaining frames based on the landmark frames. A directional indicator may be identified, inter alia, by a component configured to recognize such indicators, such as a component configured to determine if a bright light source is the sun and reference a clock to determine a direction the sun should be at for a given time of day. In another embodiment, the direction may be determined by extrapolating the direction based on geo-coordinates over many frames to determine the direction. In estimating direction for the remaining frames, a feature of a video recording device such as an accelerometer or clock may be employed to assist in establishing time, distance traveled, and relative movement of other objects.

In any case, the direction metadata is obtained at step 345, whether, in various non-limiting embodiments, through correlation with existing data as in step 340, or as stored in video metadata. If the latter, at step 350, direction metadata is retrieved from video data (e.g., shot by a user or a third party and obtained by the user) by, for example, a video processor. In various embodiments, the direction metadata may be in the form of a tag associated with a frame of the video, or may be sorted and associated with a frame of the video. Based on the obtained video frame direction, relative directions and distances of structures and objects seen in the video frames may be determined, for example, via image processing.

At step 355, an object selected by a user is obtained. In one embodiment, a user may open a video and select an object (e.g., with a mouse click, a finger tap) in the video for viewing in context with location imagery, such as, but not limited to, maps, street views, aerial views, helicopter views, satellite imagery, etc. In another embodiment, a user may select a frame (e.g., by pausing the video at that frame and/or by clicking/tapping the frame as the video plays) of a video the user is watching to view in context with location imagery. In an embodiment, the user may control the video to facilitate selecting the object or frame, such as by speeding up or slowing down the video, or playing the video frame-by-frame. The user may select the object or frame by any means now known or later discovered, including, but not limited to, pushing/tapping a touch screen, clicking with a pointer or mouse, entering a command on a keyboard, and the like. In some embodiments, the geo-coordinates and direction of the selected object or frame is determined based on the geo-coordinate and direction metadata associated with the frame of the selected object or selected frame, respectively. Moreover, as the video plays, the selected object may be tracked against a changing set of geo-coordinates and directions of subsequent frames as a location of the video perspective moves relative to the selected object.

In some embodiments, the selected object (e.g., a building or structure) is identified based on the determined geo-coordinates and direction of the object. For example, a spatial relations engine within the video processor may extrapolate specific coordinates of the selected object based on the frame geo-coordinates and direction. Moreover, in some embodiments, the coordinates may be searched (e.g., an internet search or as part of a location imagery search) to provide a name for the object. Text may also be searched (e.g., based on the object coordinates or object name) to provide additional information to the user about the object. This name and textual information may be displayed for the user in the video and/or in location imagery further discussed below.

In any case, geo-coordinate and direction metadata are received for the object or frame at a video processor, and in response, location imagery (e.g., a digital map, a street view, an aerial view, a helicopter view, a satellite image) is searched for and received at the video processor for that location and direction. Location imagery may be searched for, for example, through public databases (e.g., public government records), through online services (e.g., a mapping website), through a mapping application on a user device (e.g., a map service app), or through private/paid services. For example, a video processor can obtain a set of street views from a repository of street views such as Google Maps for a given location.

Figure 4A:
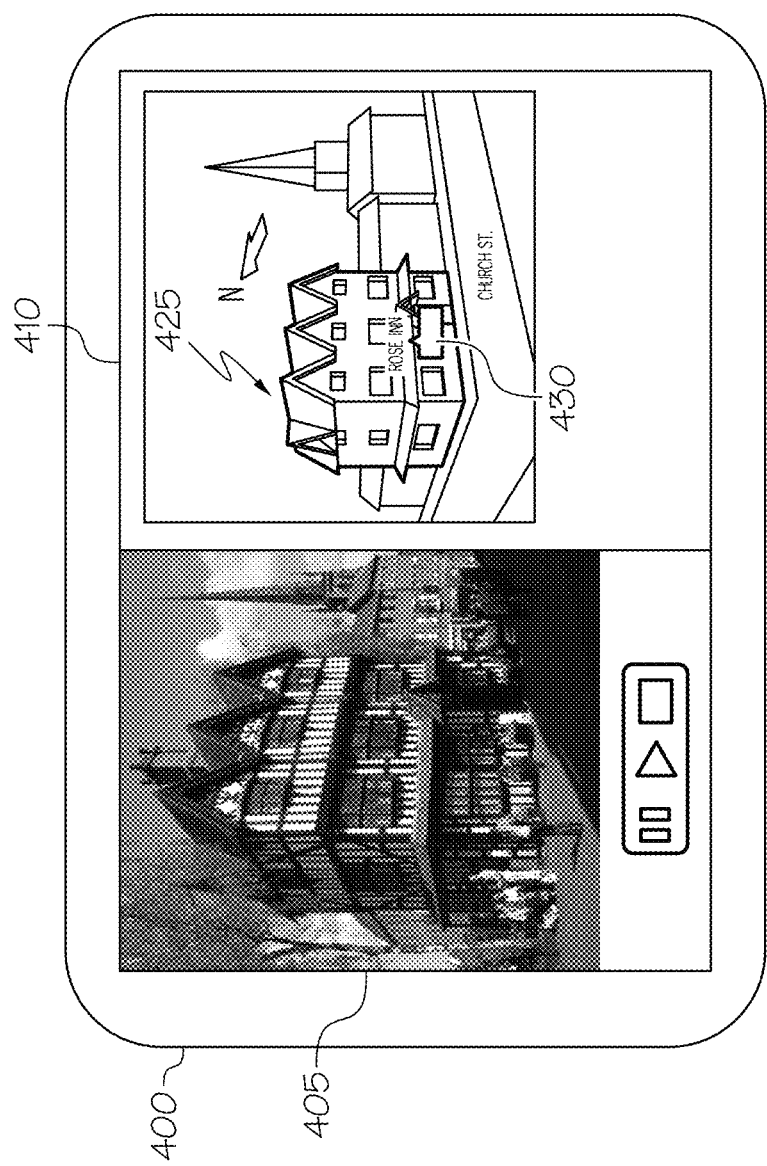
FIGS. 4A and 4B show a video and map display according to illustrative embodiments.
Figure 4B:
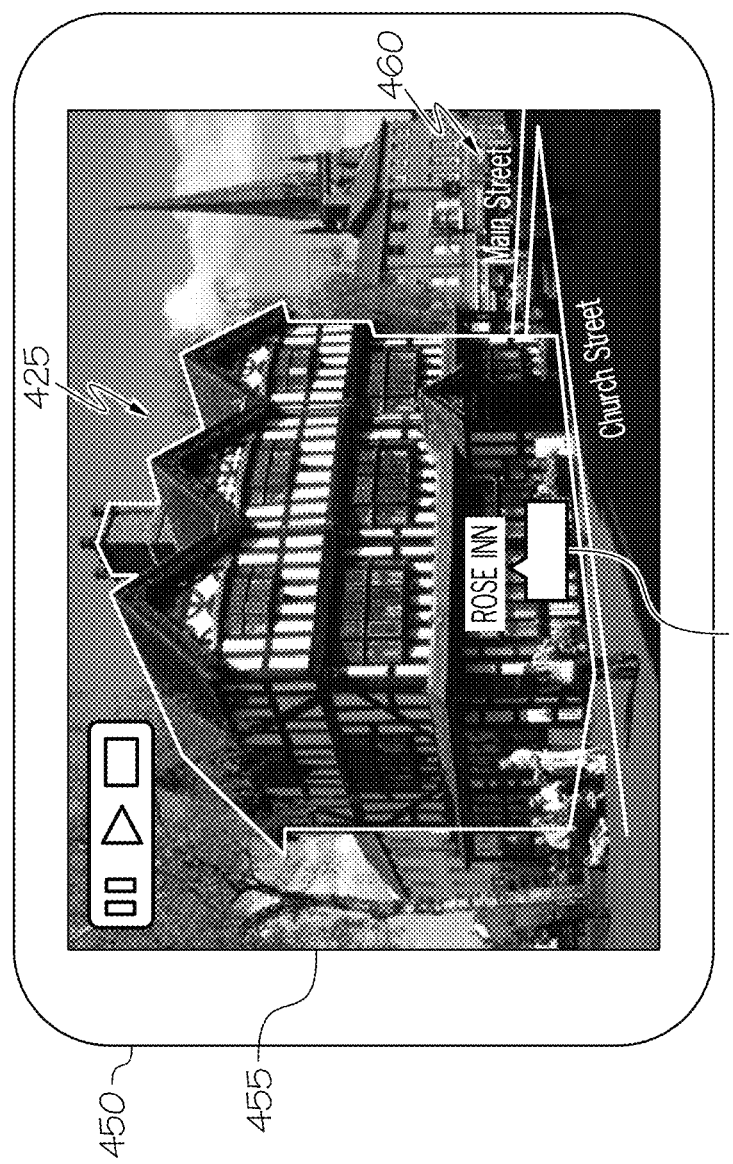

Referring now to FIGS. 3, 4A and 4B, the location imagery is displayed for a user, for example, on a device screen, at step 360. In some embodiments, the geo-coordinate and direction metadata and locational imagery are passed to a displaying device on which the user may view the video. Referring now to FIG. 4A, in one embodiment, the locational imagery may be displayed in partitioned window 400 to be viewed side-by-side with the video. In other words, video 405 may be played next to interactive location imagery 410. A user may engage interactive location imagery 410, by way of non-limiting examples, by playing video 405 and watching interactive location imagery 410 synchronize to video 405, or by clicking/tapping/etc., interactive location imagery 410 to navigate around interactive location imagery 410 while frames of video 405 remain synchronized to interactive location imagery 410. Referring now to FIG. 4B, in another embodiment, the locational imagery may be displayed as overlay 450 on top of the video. In other words, features of location imagery 460 may be laid over video 455. In one embodiment, location imagery 460 may be rendered as partially transparent and projected over video 455. In a further embodiment, features may be extrapolated from the location imagery (e.g., street names) and projected into the video. A user may engage location imagery 460, by way of non-limiting examples, by playing video 455 and watching location imagery 460 synchronize to video 455, or by clicking/tapping/etc., location imagery 460 to navigate around location imagery 460 while frames of video 455 remain synchronized to location imagery 460. In yet another embodiment (not shown), the location imagery may be opened in a separate window from the video. In any case, selected object 425 is identified for the user and may be labeled in at least any of the location imagery partition, video partition, imagery overlay, video window, or location imagery window. Additional textual information 430 may also be displayed about object 425. Furthermore, a user may select a type of location imagery media the user wishes to interact with (e.g., digital maps, street views, aerial views, helicopter views, satellite images) or switch between types of location imagery media.

Referring back to FIG. 3, the video and location imagery are synchronized at step 365. In some embodiments, the video is synchronized to the location imagery, such that the synchronization matches a video frame to a location image based on the geo-coordinate and direction metadata. For example, the geo-coordinate and direction metadata of frames of the video are tracked, and as the video plays, location imagery corresponding to each geo-coordinate and direction are searched or called up and displayed with the corresponding frame. If a video view lingers at a location, so too will the location imagery pause at that location until the video moves on. If location imagery is not available for a frame, an approximate location may be offered, or an alternative form of imagery may be offered (e.g., a map in place of a street view). In any case, in some embodiments, the location imagery is kept in context and in synch with the video. Furthermore, in some embodiments, a user may pause the synchronization. For example, a user may desire to continue watching the video while stopping the location imagery synchronization to read text about an object shown in the location imagery.

In another embodiment, the user may interactively navigate the location imagery and video at step 370. As explained above, in some embodiments, the video and location imagery are synched. Accordingly, a user may navigate the video (e.g., play, pause, rewind, fast forward, slow down) while location imagery is dynamically displayed correlating to the frames of the video being shown. A user may furthermore select additional objects in the video and request, for example, a name of the selected object or a location of the selected object. In some embodiments, the user may also interactively navigate the location imagery. For example, the user may steer/navigate around the location imagery environment to explore a specific building or area. As the user navigates the locational imagery, the video frames and location imagery will be checked to ensure that the video location metadata matches the location imagery and updates are made to the video frames and location imagery to keep the two in synch. In an interactive navigation embodiment, frames of the video may be shown to the user out of order as the user steers/navigates areas of location imagery within the corresponding bounds of the video. If the user navigates in the location imagery outside the bounds corresponding to any frames of the video, then, in one embodiment, the video window may show a message indicating video is not currently available and only show location imagery. A similar message may appear if the location imagery and video are no longer able to be synchronized. The user may navigate back within the video bounds, at which point the video may again be synchronized with the location imagery.

Figure 5:
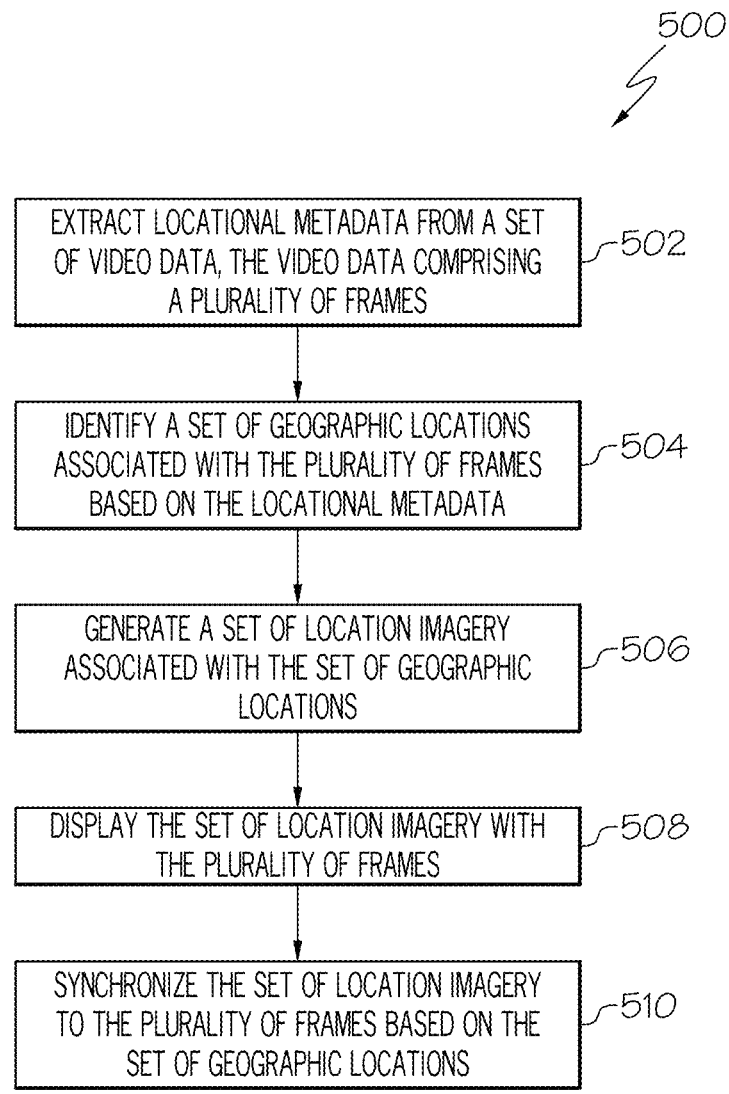
FIG. 5 shows a process flowchart for displaying location imagery in context with a video stream according to illustrative embodiments.

As depicted in FIG. 5, a system (e.g., computer system 12) carries out the methodologies disclosed herein. Shown is a process flowchart 500 for displaying location imagery in context with a video stream. At step 502, locational metadata is extracted from a set of video data, the video data comprising a plurality of frames. At step 504, a set of geographic locations associated with the plurality of frames is identified based on the locational metadata. At step 506, a set of location imagery associated with the set of geographic locations is generated. At step 508, the set of location imagery is displayed with the plurality of frames. At step 510, the set of location imagery is synchronized to the plurality of frames based on the set of geographic locations.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for displaying location imagery in context with a video stream. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for displaying location imagery in context with a video stream. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Depending on device type, a location of the computer readable program instructions may vary. For example, if the present invention is embodied in a smart phone or tablet device, the computer readable program instructions may be implemented at an operating system level and available as a service for applications to access using a service API. In another example, if the present invention is embodied in a digital camera or video recording device, the computer readable program instructions may be implemented within firmware providing application functionality.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to display location imagery in context with a video stream. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for displaying location imagery in context with a video stream, the method comprising:
   extracting locational metadata from a set of video data, the video data comprising a plurality of frames;
   identifying a set of geographic locations associated with the plurality of frames based on the locational metadata;
   generating a first set of location imagery associated with the set of geographic locations;
   displaying the first set of location imagery with the plurality of frames;
   synchronizing the first set of location imagery to the plurality of frames based on the set of geographic locations;
   obtaining a selection of an object in at least one frame of the set of frames;

identifying the selected object based on geo-coordinates and a direction in the at least one frame of the selected object in the at least one frame, conducting an Internet search based on the geo-coordinates for a textual description of the selected object, and displaying the textual description of the selected object, wherein a location of the selected object is tracked relative to a set of geo-coordinates and a frame direction of a current displayed location in the video stream as the video stream plays;

connecting a second set of location imagery, the second set of location imagery being associated with a geographic location adjacent to the first set of geographic locations associated with the plurality of frames, to the overlay of the first set of location imagery annotating the geographic location of at least one of the played set of frames, wherein the second set of location imagery comprises a set navigable of map features directly outside the set of geographic locations associated with the plurality of frames; and permitting, in response to a user interaction, navigation of location imagery beyond the first set of location imagery by permitting navigation of the second set of location imagery.

2. The method of claim 1, the method further comprising:
receiving a selection by a user of an object within the video;
identifying the object based on at least one of: video frame, geographic location, and visual indicia;
searching for descriptive information associated with the object; and
providing a description of the object in the first set of location imagery based on the descriptive information.

3. The method of claim 1, the method comprising:
receiving, from a user, a navigation instruction in the first set of location imagery; and
synchronizing a set of frames of the plurality of frames to the navigation of the first set of location imagery.

4. The method of claim 3, wherein the plurality of frames are displayed in an order based on the navigation received from the user, and wherein the synchronizing pauses when a navigation of the first set of location imagery is received from the user to a portion of location imagery that does not have an associated frame.

5. The method of claim 1, wherein the geographic locations are identified by geographic coordinate metadata and direction metadata of the video.

6. The method of claim 1, wherein at least one of the first set of location imagery and the second set of location imagery is at least one of: a map view, a street view, an aerial view, a helicopter view, and a satellite view.

7. The method of claim 1, wherein the first set of location imagery is displayed with the plurality of frames as at least one of: a side-by-side partition, an overlay, and a pop-out window.

8. A system for displaying location imagery in context with a video stream, the computer system comprising:
a memory medium comprising program instructions;
a bus coupled to the memory medium; and
a processor for executing the program instructions, the instructions causing the system to:
extract locational metadata from a set of video data, the video data comprising a plurality of frames;
identify a set of geographic locations associated with the plurality of frames based on the locational metadata;
generate a first set of location imagery associated with the set of geographic locations;
display the first set of location imagery with the plurality of frames;
synchronize the first set of location imagery to the plurality of frames based on the set of geographic locations;
obtain a selection of an object in at least one frame of the set of frames;
identify the selected object based on geo-coordinates and a direction in the at least one frame of the selected object in the at least one frame, conducting an Internet search based on the geo-coordinates for a textual description of the selected object, and displaying the textual description of the selected object, wherein a location of the selected object is tracked relative to a set of geo-coordinates and a frame direction of a current displayed location in the video stream as the video stream plays;
connect a second set of location imagery, the second set of location imagery being associated with a geographic location adjacent to the first set of geographic locations associated with the plurality of frames, to the overlay of the first set of location imagery annotating the geographic location of at least one of the played set of frames, wherein the second set of location imagery comprises a set navigable of map features directly outside the set of geographic locations associated with the plurality of frames; and
permit, in response to a user interaction, navigation of location imagery beyond the first set of location imagery by permitting navigation of the second set of location imagery.

9. The system of claim 8, the instructions further causing the system to:
receive a selection by a user of an object within the video;
identify the object based on at least one of: video frame, geographic location, and visual indicia;
search for descriptive information associated with the object; and
provide a description of the object in the first set of location imagery based on the descriptive information.

10. The system of claim 8, the instructions further causing the system to:
receive, from a user, a navigation instruction in the first set of location imagery; and
synchronize a set of frames of the plurality of frames to the navigation of the first set of location imagery.

11. The system of claim 10, wherein the plurality of frames are displayed in an order based on the navigation received from the user, and wherein the synchronization pauses when a navigation of the first set of location imagery is received from the user to a portion of location imagery that does not have an associated frame.

12. The system of claim 8, wherein the geographic locations are identified by geographic coordinate metadata and direction metadata of the video.

13. The system of claim 8, wherein at least one of the first set of location imagery and the second set of location imagery is at least one of: a map view, a street view, an aerial view, a helicopter view, and a satellite view.

14. The system of claim 8, wherein the first set of location imagery is displayed with the plurality of frames as at least one of: a side-by-side partition, an overlay, and a pop-out window.

15. A computer program product for displaying location imagery in context with a video stream, the computer program product comprising a computer readable storage device, and program instructions stored on the computer readable storage device, to:

extract locational metadata from a set of video data, the video data comprising a plurality of frames;

identify a set of geographic locations associated with the plurality of frames based on the locational metadata;

generate a first set of location imagery associated with the set of geographic locations;

display the first set of location imagery with the plurality of frames;

synchronize the first set of location imagery to the plurality of frames based on the set of geographic locations;

obtain a selection of an object in at least one frame of the set of frames;

identify the selected object based on geo-coordinates and a direction in the at least one frame of the selected object in the at least one frame, conducting an Internet search based on the geo-coordinates for a textual description of the selected object, and displaying the textual description of the selected object, wherein a location of the selected object is tracked relative to a set of geo-coordinates and a frame direction of a current displayed location in the video stream as the video stream plays;

connect a second set of location imagery, the second set of location imagery being associated with a geographic location adjacent to the first set of geographic locations associated with the plurality of frames, to the overlay of the first set of location imagery annotating the geographic location of at least one of the played set of frames, wherein the second set of location imagery comprises a set navigable of map features directly outside the set of geographic locations associated with the plurality of frames; and permit, in response to a user interaction, navigation of location imagery beyond the first set of location imagery by permitting navigation of the second set of location imagery.

16. The computer program product of claim 15, the computer readable storage device further comprising instructions to:

receive a selection by a user of an object within the video;

identify the object based on at least one of: video frame, geographic location, and visual indicia;

search for descriptive information associated with the object; and provide a description of the object in the first set of location imagery based on the descriptive information.

17. The computer program product of claim 15, the computer readable storage device further comprising instructions to:

receive, from a user, a navigation instruction in the first set of location imagery; and synchronize a set of frames of the plurality of frames to the navigation of the first set of location imagery.

18. The computer program product of claim 17, wherein the plurality of frames are displayed in an order based on the navigation received from the user, and wherein the synchronization pauses when a navigation of the first set of location imagery is received from the user to a portion of location imagery that does not have an associated frame.

19. The computer program product of claim 15, wherein the geographic locations are identified by geographic coordinate metadata and direction metadata of the video.

20. The computer program product of claim 15, wherein at least one of the first set of location imagery and the second set of location imagery is at least one of: a map view, a street view, an aerial view, a helicopter view, and a satellite view.

* * * * *